United States Patent [19]
Christensen et al.

[11] 3,718,734
[45] Feb. 27, 1973

[54] HYDROGEN PURIFICATION
[75] Inventors: Robert I. Christensen, San Rafael; David B. Larimore, Berkeley, both of Calif.
[73] Assignee: Chevron Research Company, San Francisco, Calif.
[22] Filed: Nov. 16, 1970
[21] Appl. No.: 89,673

[52] U.S. Cl. ............... 423/228, 208/108, 208/212, 423/564, 423/574
[51] Int. Cl. ............................................ C01b 17/16
[58] Field of Search ............... 23/225, 2, 181, 193; 208/208–212, 216, 217; 55/48, 73

[56] References Cited

UNITED STATES PATENTS

| | | | |
|---|---|---|---|
| 3,417,011 | 12/1968 | Carson | 208/108 |
| 3,340,182 | 8/1967 | Berkman et al. | 208/212 |
| 3,069,351 | 12/1962 | Davis | 208/216 X |

*Primary Examiner*—G. O. Peters
*Attorney*—T. G. De Jonghe, G. F. Magdeburger, R. H. Davies and J. A. Buchanan, Jr.

[57] ABSTRACT

In a hydrotreating process, the improvement is made which comprises contacting the recycle hydrogen-rich gas stream with an $H_2S$ and $NH_3$ absorbent to thereby remove from the recycle hydrogen-rich gas at least 90 volume percent of both the $H_2S$ and $NH_3$ before the recycle hydrogen-rich gas is recycled to the hydrotreating reactor, omitting aqueous injection into the hydrotreating reactor effluent between the reactor effluent withdrawal point and said high pressure separator, and maintaining conditions of temperature and partial pressures of $H_2S$ and $NH_3$ above sublimation condition for $NH_4SH$ between the reactor effluent withdrawal point and said high pressure separator.

14 Claims, 3 Drawing Figures

HYDROGEN PURIFICATION

BACKGROUND OF THE INVENTION

The present invention relates to the purification of recycle hydrogen for a hydroconversion process such as hydrotreating or hydrocracking. More particularly, the present invention relates to the removal of both $H_2S$ and $NH_3$ from recycle hydrogen gas and to methods for avoiding plugging of hydrotreater reactor effluent piping and exchangers and to particular means of recovering the $NH_3$ and $H_2S$ removed from the recycle hydrogen gas.

In many hydrogenative conversion processes applied to hydrocarbon oils, of which catalytic hydrogenation, hydrofining or hydrodesulfurization, and hydrocracking are typical examples, $H_2S$ and $NH_3$ are produced as a result of reaction of hydrogen with sulfur compounds and nitrogen compounds contained in the oil. Sometimes this conversion of one or the other or both of the sulfur and nitrogen compounds is the desired reaction, while in other cases it is merely an incidental reaction. In a typical process normally liquid hydrocarbon oil containing nitrogen compounds and sulfur compounds and recycle hydrogen-rich gas and makeup hydrogen are passed through a reaction zone, usually containing a catalyst, at elevated temperature and pressure at which at least a portion of the hydrocarbons are vaporized, and there is obtained as a reaction zone effluent a mixture of vaporized hydrocarbons, hydrogen, $H_2S$ and $NH_3$. The effluent may also contain heavier hydrocarbons which are liquid at the reaction conditions. The reaction effluent is cooled to condense vaporized hydrocarbons, whereby the liquid hydrocarbons can then be separated from hydrogen-rich recycle gas, which is then reused in the process.

In many instances, it has been common practice to permit the $H_2S$ to build up in the recycle hydrogen to concentrations such that their partial pressures become high enough that the net production of $H_2S$ thereafter will completely dissolve in the liquid hydrocarbons separated from equilibrium with the recycle gas. This reduces the hydrogen partial pressure in the reaction zone unless a correspondingly higher total pressure is used, in which case the costs of building and operating the process are significantly higher. To restrict the concentration build-up of $H_2S$ in recycle gas, a portion of the recycle gas may be bled from the system. Then, however, more makeup hydrogen is needed, which may be no less costly than using a high enough pressure so that no bleed is needed. In any event, it is necessary to remove the $NH_3$ (usually by water scrubbing) from the reactor effluent in order to prevent formation of solid $NH_4SH$ deposits with resultant plugging.

Various methods have been proposed for removing the $H_2S$ from the recycle hydrogen and also for removing the $H_2S$ from the reactor effluent material before the recycle hydrogen is separated from the reactor effluent hydrocarbons.

For example, in accordance with the process disclosed in U.S. Pat. No. 3,340,182, $NH_3$ and $H_2S$ are removed from a hydroconversion reactor effluent by scrubbing the effluent with water to which is added another stream containing more of one of the by-products, so that an ammonium bisulfide aqueous solution is formed containing essentially all the $NH_3$ and $H_2S$.

It has generally been considered necessary in accordance with modern hydroconversion technology to remove at least some of the $NH_3$ and $H_2S$ from the hydroconversion reactor effluent by water wash or water injection ahead of the high pressure separator (i.e., the separator in which recycle hydrogen gas is separated from condensed reactor effluent hydrocarbons) in order to avoid salt fouling and plugging problems in the lines and heat exchangers between the reactor effluent withdrawal point and the high pressure separator, particularly those points in the lines and exchangers which are below about 300° or 200° F. It has been found that on cooling reactor effluents containing both $H_2S$ and $NH_3$ to temperatures below about 300° F., the $H_2S$ and $NH_3$ may react to form salts (herein referred to as $NH_4SH$) which sometimes cause clogging problems in the heat exchangers and lines, as previously indicated. Injection of water into the reaction effluent upstream of the heat exchangers has been used to wash out such deposits and/or to prevent their forming. This water injection can provide means of removing much of the $NH_3$ formed if rather large amounts of water are injected sufficient to dissolve the $NH_3$. However, rarely will more than equal molar amounts of $H_2S$ with reference to the dissolved $NH_3$ also dissolve in the water. U.S. Patents wherein water injection into the reactor effluent is discussed include U.S. Pat. Nos. 3,157,590, 3,335,071, and 3,356,608.

Some references such as USP 1,980,286, disclose scrubbing of $H_2S$ and $NH_3$ from the recycle hydrogen-rich gas to a hydroconversion reaction without mention of scrubbing the reactor effluent before separating recycle hydrogen, but this generally is because of failure to appreciate the clogging problems which can result from the reaction of $H_2S$ and $NH_3$ to form salts at lower temperatures or in many instances, water injection into the reactor effluent lines is not discussed because it is not a central or particularly important feature with which the literature or patent reference is concerned.

U.S. Pat. No. 3,172,843 is a typical reference directed to a hydrodesulfurization process and disclosing injection of water into the reactor effluent lines so as to absorb $NH_3$ and some $H_2S$ and wherein an alkanolamine absorption step is also used to scrub primarily $H_2S$ from the recycle hydrogen-rich gas.

SUMMARY OF THE INVENTION

According to the present invention, an improved process is provided for operation of a hydrotreating process and the handling of $H_2S$ and $NH_3$ removal from recycle hydrogen gas in a hydrotreating process. According to the present invention, in a hydrotreating process wherein a hydrocarbon feedstock containing organic sulfur and organic nitrogen compounds is contacted at elevated temperature and pressure and in the presence of hydrogen with hydrotreating catalyst in a hydrotreating reactor to form an effluent comprising hydrocarbons, hydrogen sulfide, ammonia and hydrogen and wherein the effluent is withdrawn from the reactor and cooled and passed to a high pressure separator wherein hydrocarbons are separated from a hydrogen-rich gas stream and wherein the separated hydrogen-rich gas stream is recycled at least in part to the hydrotreating reactor, the improvement is made which comprises contacting the recycle hydrogen-rich gas stream with an $H_2S$ and $NH_3$ absorbent to thereby remove from the recycle hydrogen-rich gas at least 90 volume percent of both the $H_2S$ and $NH_3$ before the recycle hydrogen-rich gas is recycled to the hydrotreating reactor, omitting aqueous injection into the hydrotreating reactor effluent between the reactor effluent withdrawal point and said high pressure separator, and maintaining conditions of temperature and partial pressures of $H_2S$ and $NH_3$ above sublimation condition for $NH_4SH$ between the reactor effluent withdrawal point and said high pressure separator.

In the present specification, the term "hydrotreating" is used to mean those hydroconversion processes wherein $NH_3$ and $H_2S$ are formed during the treatment of hydrocarbon feedstocks at elevated temperatures and pressures with hydrogen. Typically, the hydrotreating reaction is carried out in the presence of catalyst particles such as Group VI and Group VIII metal components impregnated on refractory supports or cogelled together with refractory support material such as alumina or silica-alumina.

The term "hydrotreating" is used herein in some distinction to hydrocracking reactions as hydrocracking in many instances is carried out with previously hydrotreated feedstocks containing essentially no organic nitrogen and sulfur or only a few parts per million or organic nitrogen and sulfur so that the process of the present invention has little application. The process of the present invention is primarily concerned with feedstocks having a few tenths percent sulfur and nitrogen or more. The present invention is preferably applied to heavy oils containing at least 0.5 weight percent sulfur and at least .05 weight percent nitrogen, both being present in the feedstocks as organic compounds. Particularly preferred heavy oil feedstocks include whole crude oils, reduced crudes, vacuum residua, solvent deasphalted oils, vacuum gas oils, and shale oils. The process of the present invention is particularly advantageously applied to Arabian and other middle-eastern crude oils and crude oil fractions having a relatively high organic sulfur content as opposed to California crudes, for example, having a relatively low sulfur content and higher organic nitrogen content.

The process of the present invention is particularly advantageous in that clogging of the hydrotreater reactor effluent lines due to deposition of salts which tend to form from the reaction of $NH_3$ with $H_2S$ is substantially avoided while at the same time, a substantial savings is made by eliminating water injection into the reactor effluent lines and by eliminating corrosion problems which frequently are attendant to the use of water injection to scrub $NH_3$ and a portion of the $H_2S$ from the reactor effluent. The present invention is based partly on the finding that by scrubbing a large portion, at least 90 volume percent, of both the $H_2S$ and $NH_3$ from the recycle hydrogen-rich gas so as to aid in maintaining relatively low partial pressures for the $H_2S$ and $NH_3$ in the reactor effluent system, and by maintaining a relatively high temperature for the bulk fluid, usually at least 120° or 130° F., in the reactor effluent exchangers and high pressure separator, as opposed to previously used temperatures as low as 80° to 110° F. for the bulk fluid ("skin" or metal wall temperatures for the exchanger tubes generally are 30° to 60° F. lower than the bulk fluid temperature), the salts which tend to form from the reaction of $H_2S$ with $NH_3$ can be substantially avoided to thereby avoid or reduce deposition of solids in the reactor effluent lines and heat exchangers ahead of the high pressure separator. Preferably, at least 95 volume percent of both the $H_2S$ and the $NH_3$ are removed before the recycle hydrogen-rich gas is recycled to the hydrotreating reactor. Preferably, the reactor effluent is cooled no further than 130° F. and in most instances (particularly when processing heavy residua feedstocks) is cooled no further than 140° F. at any point between the reactor effluent withdrawal point and the high pressure separator. Bulk fluid temperatures as high as 180° – 200° F. are usually feasible and preferred temperatures are between about 140° F. and 160° F. for most feedstocks.

Thus, in the process of the present invention, the high pressure separator will be operated preferably at a temperature of at least 130° F. and in most instances, preferably at least 140° F., as the high pressure separator is essentially the final point in the reactor effluent line at which it is important in accordance with the process of the present invention to maintain conditions above the sublimation condition for $NH_4SH$.

As will become more apparent from FIGS. 2 and 3, to be discussed hereinbelow, various factors affect the sublimation point for $NH_4SH$. Conditions of temperature and partial pressures of $H_2S$ and $NH_3$ are the primary or ultimate factors involved. Among other factors affecting the formation or not of solid $NH_4SH$ in the reactor effluent line and exchangers are the $H_2S$ partial pressure, the $NH_3$ partial pressure and in turn, the amount of organic sulfur coming out of the hydrotreating feedstock as $H_2S$, the amount of organic nitrogen coming out as $NH_3$, the feed type in that it affects the organic sulfur and the organic nitrogen content, and the feed type in that it affects the $\Delta T$ across the laminar film inside the heat exchanger tubes. For relatively heavy feeds such as residuum feedstocks with which the present invention is particularly concerned, there is a relatively high $\Delta T$ across the film due to the relatively high viscosity of most residuum or heavy oil feedstocks boiling primarily above 650° F. Thus, for example, in the case of vacuum gas oils, the film $\Delta T$ may be only approximately 20° or 30° F. whereas for residua feedstocks, the film $\Delta T$ may be as high as approximately 50° F. Therefore, in using the process of the present invention as applied to the hydrodesulfurization of vacuum gas oils, in many instances, it is suitable to maintain the reactor effluent temperature above about 130° F. whereas in processing residua, particularly residua having a high sulfur content and a relatively high viscosity, it is usually preferable to maintain the temperature in the reactor effluent lines above 145° F. when employing the process of the present invention. In the process of the present invention, the temperatures in the reactor effluent lines and exchangers (and thus in the high pressure separator) is preferably maintained above the sublimation temperature for $NH_4SH$ in an amount at least equal to the approximate $\Delta T$ across the process side laminar film in the final heat exchanger before the high pressure separator, which usually requires that the temperature in the high pressure separator be maintained about 20° to 80° F. above the sublimation temperature for the prevailing $H_2S$ and $NH_3$ partial pressures in the reactor effluent.

The reactor effluent lines and exchangers must be maintained at conditions of temperature and partial pressure so as to be above the sublimation point as can be determined from FIG. 2 discussed hereinbelow. Thus, in many instances, both the temperature and total pressure of the reaction system will need to be adjusted. As can be seen from FIG. 2, maintaining a relatively high temperature aids in the maintaining of $NH_3$ and $H_2S$ in the vapor or gaseous phase. Also, lower partial pressures and hence, lower total pressure for the reaction system aids in maintaining $H_2S$ and $NH_3$ in the vapor or gaseous phase. Preferably, the hydrotreating reaction to which the process of the present invention is applied is carried out at a pressure below about 2,500 psig and more preferably, below about 1,500 or 1,000 psig to thereby aid in maintaining relatively low partial pressure for $H_2S$ and $NH_3$ which partial pressures are approximately equal to the mole fraction of the respective constituent times the total pressure.

Various absorbents can be used in the process of the present invention, but alkanolamine absorbents together with water are preferred absorbents for removing both $H_2S$ and $NH_3$ from the recycle hydrogen gas. Particularly preferred absorbent solutions for use in the process of the present invention comprise solutions of an alkanolamine with water, most preferably relatively dilute solutions containing less than 30 weight percent MEA in the MEA-water solution, such as solutions of 15 percent or less MEA in water, or solutions such as 20 to 40 weight percent diethanolamine (DEA) in water. Contrasted to the use of other aqueous absorption media such as aqueous ammonia as an absorbent for the recycle hydrogen gas, the aqueous solutions of alkanolamine (particularly MEA-water) were found to have a decided advantage in terms of absorbent solution circulation rate in order to obtain a high degree of $NH_3$ and $H_2S$ removal.

According to a particularly preferred overall process embodiment, an improved process is provided for removing $H_2S$ and $NH_3$ from recycle hydrogen gas to a hydrotreater reactor, avoiding clogging in the reactor effluent lines and exchangers and treating the $NH_3$-$H_2S$-rich absorbent used to remove the $NH_3$ and $H_2S$ from the recycle gas so as to provide a relatively pure $H_2S$ stream and an $H_2S$—$NH_3$ stream. According to the preferred overall process embodiment, in a hydrotreating process wherein a hydrocarbon feedstock containing organic sulfur and organic nitrogen compounds is contacted at elevated temperature and pressure and in the presence of hydrogen with hydrotreating catalyst in a hydrotreating reactor to form an effluent comprising hydrocarbons, hydrogen sulfide, ammonia and hydrogen and wherein the effluent is withdrawn from the reactor and cooled and passed to a high pressure separator wherein hydrocarbons are separated from a hydrogen-rich gas stream and wherein the separated hydrogen-rich gas stream is recycled at least in part to the hydrotreating reactor, the improvement is made which comprises contacting the recycle hydrogen-rich gas stream with an $H_2S$ and $NH_3$ absorbent to thereby remove from the recycle hydrogen-rich gas at least 90 volume percent of both the $H_2S$ and $NH_3$ before the recycle hydrogen-rich gas is recycled to the hydrotreating reactor, omitting or at least reducing aqueous injection into the hydrotreating reactor effluent between the reactor effluent withdrawal point and said high pressure separator, and maintaining conditions of temperature and partial pressures of $H_2S$ and $NH_3$ above sublimation condition for $NH_4SH$ between the reactor effluent withdrawal point and said high pressure separator, stripping $H_2S$ and $NH_3$ from the absorbent in a regenerator vessel and removing $H_2S$ and $NH_3$ together with water vapor as an overhead stream via an overhead line from the top of the regenerator vessel, injecting a recirculating water stream into the top of the regenerator vessel or into the overhead line from the top of the regenerator vessel so as to absorb $NH_3$, cooling the overhead stream so as to condense $H_2O$, passing the cooled overhead stream to an overhead separator vessel, withdrawing a gaseous stream of $H_2S$ containing less than 5 mole percent $NH_3$ from the separator, withdrawing a liquid stream comprising $H_2O$, $NH_3$, and $H_2S$ from the separator, stripping $H_2S$ and $NH_3$ from the liquid stream to obtain a purified water stream which is recirculated and injected into the regenerator overhead system as aforesaid to absorb $NH_3$.

Preferably, the hydrocarbon feedstock which is hydrotreated in the process of the present invention contains nitrogen and sufficient sulfur as organic compounds, and is hydrodesulfurized under sufficiently mild conditions, so as to produce a hydrotreating reactor effluent containing at least three moles $H_2S$ per each mole $NH_3$. Operating in accordance with the above-indicated general conditions is advantageous in the process of the present invention in that a relatively pure $H_2S$ stream can be produced in accordance with the overall preferred embodiment as indicated above, together with an $H_2S$—$NH_3$ stream, which streams are suitable as dual feedstreams to a sulfur production process. The $H_2S$—$NH_3$ stream which is stripped from the aqueous liquid stream withdrawn from the absorbent regenerator overhead system is combusted with oxygen to obtain $SO_2$ and $N_2$ (together with some small amounts of nitrogen oxides) and this $SO_2$ is reacted with $H_2S$ withdrawn as a gaseous stream from the overhead separator vessel of the regenerator. The $SO_2$ is reacted with $H_2S$ according to the reaction:

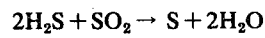
$$2H_2S + SO_2 \rightarrow S + 2H_2O$$

Thus, it is seen that for each mole of $SO_2$, 2 moles of $H_2S$ are necessary in order to carry out the above-indicated reaction for the production of sulfur.

DETAILED DESCRIPTION

Figure 1:
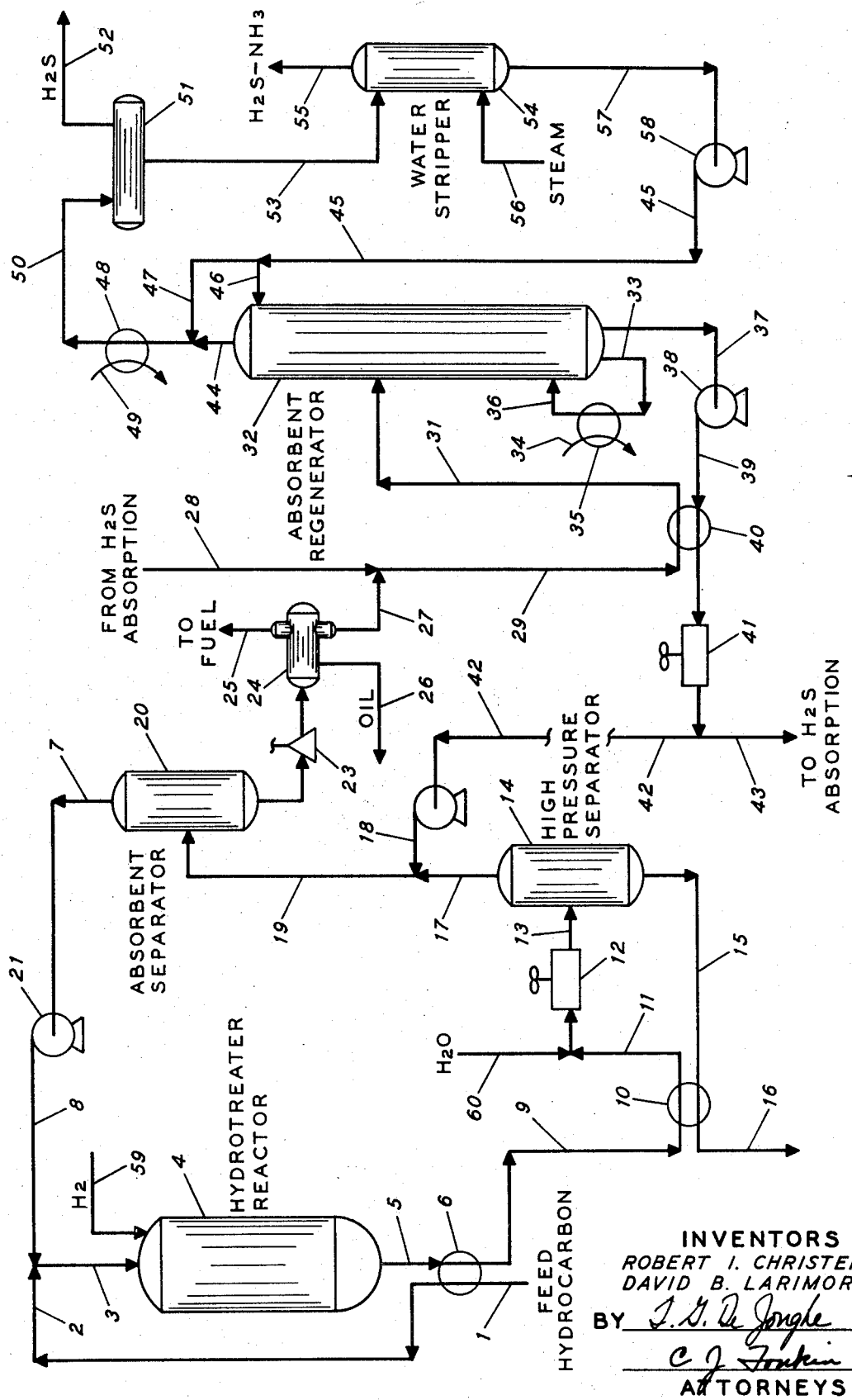
FIG. 1 is a schematic process flow diagram illustrating preferred embodiments of the present invention.

Referring more particularly to FIG. 1, feed hydrocarbon is introduced to the process via line 1. As previously indicated, the feed hydrocarbon is preferably a heavy oil such as a resid stock containing a substantial amount of sulfur but also containing at least some organic nitrogen compounds. Preferably, at least 50 percent of the hydrocarbon feedstock boils above 800° F. Before introduction to hydrotreater reactor 4, the feed hydrocarbon stream can be exchanged with reactor effluent in heat exchanger 6. The preheated feed hydrocarbon is then withdrawn from exchanger 6 via line 2 and after combination with recycle hydrogen via line 8 is passed via line 3 to hydrotreating reactor 4.

Operating conditions for the hydrotreater usually include a temperature between about 600° to 900° F., a pressure between about 200 and 6,000 psig, a hydrogen gas rate of about 500 to 10,000 SCF per barrel of feed hydrocarbon, a liquid hourly space velocity of about 0.1 to 10.0, and the use of catalyst particles comprising Group VI and/or Group VIII metal components together with a refractory material such as alumina or silica-alumina. As indicated previously, according to a preferred embodiment of the present invention, the present invention is carried out with feedstocks and under reaction conditions which are suitable to produce a reactor effluent containing more $H_2S$ than $NH_3$. Thus, advantageous feedstocks include middle-eastern feedstocks, particularly middle-eastern reduced crude or vacuum residuum containing a relatively high amount of sulfur as opposed to California crude oil or crude oil fractions, for example, containing a smaller amount of sulfur and relatively large amount of organic nitrogen.

In the case of either high sulfur or high nitrogen feedstocks, and particularly with feedstocks wherein there is not a relatively large amount of organic sulfur compared to organic nitrogen, preferably the reaction conditions are adjusted so as to favor the desulfurization of the feed as opposed to the denitrification of the feed. In general, the sulfur is more easily removed than the organic nitrogen and thus, relatively mild hydroconversion conditions are preferred and the use of a less acidic hydroconversion catalyst is preferred. Thus, whereas temperatures between 750° and 850° F. may be favored for hydrodenitrification of a particular feedstock, when primarily hydrodesulfurization is desired, temperatures between 700° and 800° F. would be more preferred. Pressures which are 10 to 50 percent lower and space velocities which are 10 to 100 percent higher than used for hydrodenitrification are preferably used when hydrodesulfurization of a given feedstock is desired as the primary reaction as opposed to hydrodenitrification.

Catalysts containing a relatively low amount of silica or no silica such as Group VI and Group VIII components on alumina with only a few percent silica or with no silica are preferred for primarily hydrodesulfurization reactions as opposed to catalysts having a higher acidity due to the presence of more silica. Also, it is usually desirable to use a catalyst which is substantially free of fluoride or other halides as these have a tendency to increase the acidity of the catalyst and result in a catalyst less advantageous for mild hydrodesulfurization. Suitable catalysts include catalysts comprising alumina with a nickel and molybdenum component. For example, U.S. Pat. No. 3,493,517 is directed to and discloses hydrodesulfurization catalyst compositions which are particularly suitable for use in the process of the present invention.

The hydrotreating reaction effluent is withdrawn from hydrotreater reactor 4 via line 5 in the schematic process flow diagram. It is usually preferred to use a fixed bed reaction system, i.e., with the catalyst being held in place in fixed catalyst beds. However, fluidized systems can also be used wherein the catalyst is fluidized or ebullated by upward flowing reactants. In the case of either fixed catalyst beds or fluidized catalyst masses, the effluent may be withdrawn from the reactor at various positions, usually the bottom of the reactor in the case of fixed catalyst beds and usually the top or upper part of the reactor in the case of fluidized reaction systems. Regardless of where the point of withdrawal from the hydrotreater reactor is located, the reactor effluent must be cooled in order to facilitate separating recycle hydrogen-rich gas from product hydrotreated hydrocarbons.

In the schematic process flow diagram, the reactor effluent is cooled in exchanger 6, then passed via line 9 to exchanger 10 wherein it is further cooled and then passed via line 11 to exchanger 12 wherein the reactor effluent is still further cooled by exchange for example, with ambient air in fin fan cooler 12.

In some cases, it is advantageous to include a high temperature (400°–600° F.) flash drum after the effluent has been partially cooled (as in line 9). The hot liquid from this drum flows directly to distillation. The vapor is further cooled and scrubbed to remove $H_2S$ and $NH_3$ in accordance with the process of the present invention.

The reactor effluent withdrawn via line 5 from the hydrotreater reactor is composed primarily of vaporized and/or liquid hydrocarbons, hydrogen, $H_2S$ and $NH_3$. Usually, the cooling which takes place in the first exchangers, for example, exchangers 6 and 10, will not be sufficiently great to cause a high probability of $NH_4SH$ salt deposition. However, the lower temperatures which are reached in the subsequent exchanger; for example, exchanger 12, will be close to those at which deposition of solid $NH_4SH$ can occur. In many prior processes, instead of an air cooler for exchanger 12, exchange with cooling water is used as the final exchange before the high pressure separator. In the use of either air exchangers or cooling water exchangers, the reactor effluent flowing through the tubes in the final heat exchanger is typically cooled to a temperature in the range of 80°–200° F. while it is flowing through the exchanger tubes. At these temperatures, and at the high pressures, usually in the order of 2,000 psig, deposition of solid $NH_4SH$ may occur in the exchanger tubes. According to prior processes, it was typical to cool the reactor effluent to temperatures in the range of about 80°–120° F. in the exchanger equivalent to exchanger 12 and it was typical to inject water via line 60 into line 11 to aid in the prevention of the formation of solid $NH_4SH$ salts and to wash $NH_3$ and approximately an equal molar amount of $H_2S$ out of the reactor effluent stream.

The water injected via line 60 according to prior processes would then be separated from the reactor effluent in high pressure separator 14 and passed to subsequent treatment or disposal.

In the process of the present invention, water injection via line 60 preferably is omitted. In the process of the present invention, it is critical to remove at least 90 volume percent of both the $H_2S$ and $NH_3$ from the recycle hydrogentrich gas before the hydrogen is recycled to the hydrotreater reactor. It is also critical in the present invention to maintain conditions of temperature and partial pressures of $H_2S$ and $NH_3$ above sublimation conditions for $NH_4SH$ between the reactor effluent withdrawal point and the high pressure separator with, of course, the most important point of concern being the heat exchanger equivalent to exchanger 12 and the lines and elbows leading from exchanger 12 to high pressure separator 14. In nearly all instances, it is important to maintain the temperature for the reactor effluent material flowing through exchanger 12 and in line 13 to high pressure separator 14 above about 130° F. and temperatures above 140° F. and particularly in the case of residuum feedstocks, above 150° F. are particularly preferred in the process of the present invention. It is to be noted that the temperatures referred to herein are bulk fluid temperatures. Fluid temperatures at or near the wall of the exchanger tubes will, of course, be lower than the bulk fluid temperature.

Referring again more particularly to the FIG. 1 flow diagram, cooled and condensed liquid hydrocarbons are withdrawn from the bottom of high pressure separator 14 via line 15 and after passage through exchanger 10 are sent to further treatment via line 16. The further treatment can consist of a low pressure separator followed by distillation facilities or in some instances, the Similarly pressure separator is preferably omitted and the liquid hydrocarbons from the reactor are sent directly to distillation to separate out product material such as gasoline cuts or feedstocks suitable for further processing such as hydrocracking or catalystic cracking to prepare gasoline, jet fuel, or lubricating oil products from the hydrotreated material. Whether the hydrotreater reactor effluent liquid hydrocarbons are passed to a low pressure separator or directly to distillation facilities, there will be some $H_2S$ which flashes off from the liquid hydrocarbons when the pressure on the liquid hydrocarbons is reduced from the pressure of about 1,000 to 3,000 psig prevailing in high pressure separator 14 to pressures of the order of 200 psig used in the distillation facilities. The dissolved $H_2S$ which flashes off from the liquid hydrocarbons as the pressure is lowered can advantageously be removed by the recycle gas absorbent mixture as indicated in line 43. Thus, according to the present invention, the same absorbent which is used to remove $H_2S$ and $NH_3$ from the recycle hydrogen-rich gas is preferably used to remove $H_2S$ which flashes off from the hydrotreater reactor effluent liquid hydrocarbons on reducing the pressure to about 100 to 500 psig and for absorption of other possible $H_2S$ streams in the associated refinery processing units. The $H_2S$-lean absorbent is passed to these various $H_2S$ absorption services via line 43 and returned to the absorbent regeneration facilities via line 28.

The hydrogen-rich recycle gas for hydrotreater 4 is withdrawn from high pressure separator 14 via line 17. Lean absorbent is injected via line 18 into the recycle gas withdrawn from the high pressure separator via line 17. The lean absorbent is contacted with the hydrogen-rich gas so as to absorb $H_2S$ and $NH_3$ present in the recycle hydrogen gas. Although the absorption may be carried out simply by in-line injection and subsequent contacting, the absorption may also be carried out in a scrubbing or contacting vessel and then passed via line 19 to absorbent separator 20.

Purified hydrogen-rich gas is withdrawn via line 7 from separator 20. Preferably, at least 95 volume percent of both the $H_2S$ and $NH_3$ are removed from the recycle hydrogen-rich gas and more preferably, at least 98 volume percent of the $H_2S$ and $NH_3$ are removed. The purified hydrogen-rich gas is passed via line 7 to recycle compressor 21 which boosts up the pressure by about 200 to 300 psi to compensate for the pressure drop in the hydrogen recycle loop. The recycle hydrogen is then passed via line 8 and line 3 to the hydrotreater reactor and, together with fresh or make-up hydrogen added via line 59, is used for the hydrotreating reactions carried out in reactor 4.

Preferred absorbents for removing $H_2S$ and $NH_3$ from the recycle gas are alkanolamines such as monoethanolamine (MEA), diethanolamine (DEA), and trialkanolamines, such as triethanolamine. Monoethanolamine or diethanolamine is particularly preferred and it is particularly preferred to use the MEA or DEA together with water, preferably in a relatively dilute solution containing less than 30–35 weight percent MEA or DEA based on the combined weight of the MEA or DEA and water. The MEA or DEA is very effective for the absorption of $H_2S$ and the water is effective for absorbing $NH_3$, particularly in the presence of $H_2S$, as the $H_2S$ readily dissolves in the water due to relatively high solubility in the amine-water mixture.

The $H_2S$—$NH_3$-rich absorbent is removed from the bottom of separator 20 and after expansion in power recovery turbine 23 is passed to separator 24. In separator 24, light gases are removed as indicated via line 25 and oil is skimmed off and removed as indicated via line 26. The preferred aqueous absorbent rich in $H_2S$ and $NH_3$ is passed via line 27 and 29 together with $H_2S$-rich absorbent recycled via line 28 from other $H_2S$ absorption services to heat exchanger 40 prior to introduction to absorbent regenerator 32 via line 31.

In absorbent regenerator 32, the absorbent is regenerated by stripping gases or by reboiling as indicated in FIG. 1 by reboiler 35. Heat is added to reboiler 35, for example, by steam passed through the reboiler via line 34 and exchanged with absorbent material circulated via lines 33 and 36. The stripped absorbent is withdrawn from the bottom of the regenerator via line 37 and then is pumped up to higher pressure via line 38 and passed via line 39 through exchangers 40 and 41 to lines 42 and 43. Part of the regenerated absorbent is then passed via line 43 to various $H_2S$ absorption services. Another part of the absorbent is passed via line 42 and then 18 for contacting with the $H_2S$—$NH_3$ contaminated recycle hydrogen-rich gas.

The $H_2S$ and $NH_3$ which are stripped from the absorbent in absorbent regenerator 32 are removed from the top of regenerator 32 via line 44. In accordance with a particularly preferred overall process embodiment of the present invention, the $H_2S$ and $NH_3$ stream removed from the top of the regenerator is contacted with recirculated water introduced via line 46 to the upper or top part of the regenerator and more preferably, via line 47 to the overhead line from the regenerator leading to the overhead condenser and then the overhead separating vessel. The overhead removed from the absorbent regenerator via line 44 will contain at least some water vapor, but usually it is preferred to inject some recirculated liquid water to aid in the production of a relatively pure $H_2S$ stream by forming an aqueous phase in overhead separator 51 composed primarily of $NH_3$ with an equal molar amount of $H_2S$ together with the liquid water. Thus, the overhead from the absorbent regenerator is cooled in exchanger 48, for example, by water flowing through exchanger 48 via line 49 and then cooled effluent from exchanger 48 is then passed via line 50 to the overhead separator vessel 51. A purified $H_2S$ stream containing less than 5 mole percent $NH_3$ and usually less than about ½ to 1 mole percent $NH_3$ is withdrawn via line 52 from the overhead separator vessel.

A liquid aqueous stream containing $NH_3$ and an equal molar amount of $H_2S$ is withdrawn via line 53 from the overhead separator vessel.

The liquid aqueous solution of $H_2S$ and $NH_3$ is passed via line 53 to water stripper 54 wherein $H_2S$ and $NH_3$ are stripped from the aqueous solution with steam or other heating means applied near the bottom of the water stripper. The purified water is removed from the bottom of the water stripper via line 57 and then pumped back to the regenerator overhead system via pump 58 in line 45.

The $H_2S$—$NH_3$ stream stripped from the aqueous stream in stripper 54 is removed via line 55. Preferably, the $H_2S$—$NH_3$ stream is then burned to form a stream comprising $SO_2$ and $N_2$ which can be reacted with the purified $H_2S$ stream in line 52 in a modified Claus plant to form sulfur according to the reaction:

$$2H_2S + SO_2 \rightarrow 3S + 2H_2O$$

Because, as can be seen from the above reaction, 2 moles of $H_2S$ are needed for each mole of $SO_2$, it is preferable to have at least 3 moles of $H_2S$ per mole of $NH_3$ in the hydrotreater reactor effluent, so that there will be at least 2 moles of $H_2S$ in the purified $H_2S$ stream removed in the regenerator system via line 52 for each mole of $H_2S$ in the approximately equimolar $H_2S$—$NH_3$ stream removed via line 55. Preferably, there is at least about 3-½ to 4 or more moles of $H_2S$ per mole of $NH_3$ in the hydrotreater reactor effluent so that a higher purity $H_2S$ stream can be produced in line 52 by using more water injection into the regenerator overhead system and/or by using ammonia or ammonia-water injection into the overhead system resulting in an increased $H_2S$—$NH_3$ stream withdrawn via line 55. To achieve the desired $H_2S$—$NH_3$, the hydrotreater feedstock is primarily desulfurized as opposed to denitrified and the feedstock is preferably restricted to feedstocks containing at least 2 or more atoms S per atom N, the S and N being present in the feedstock as organic compounds.

Figure 2:
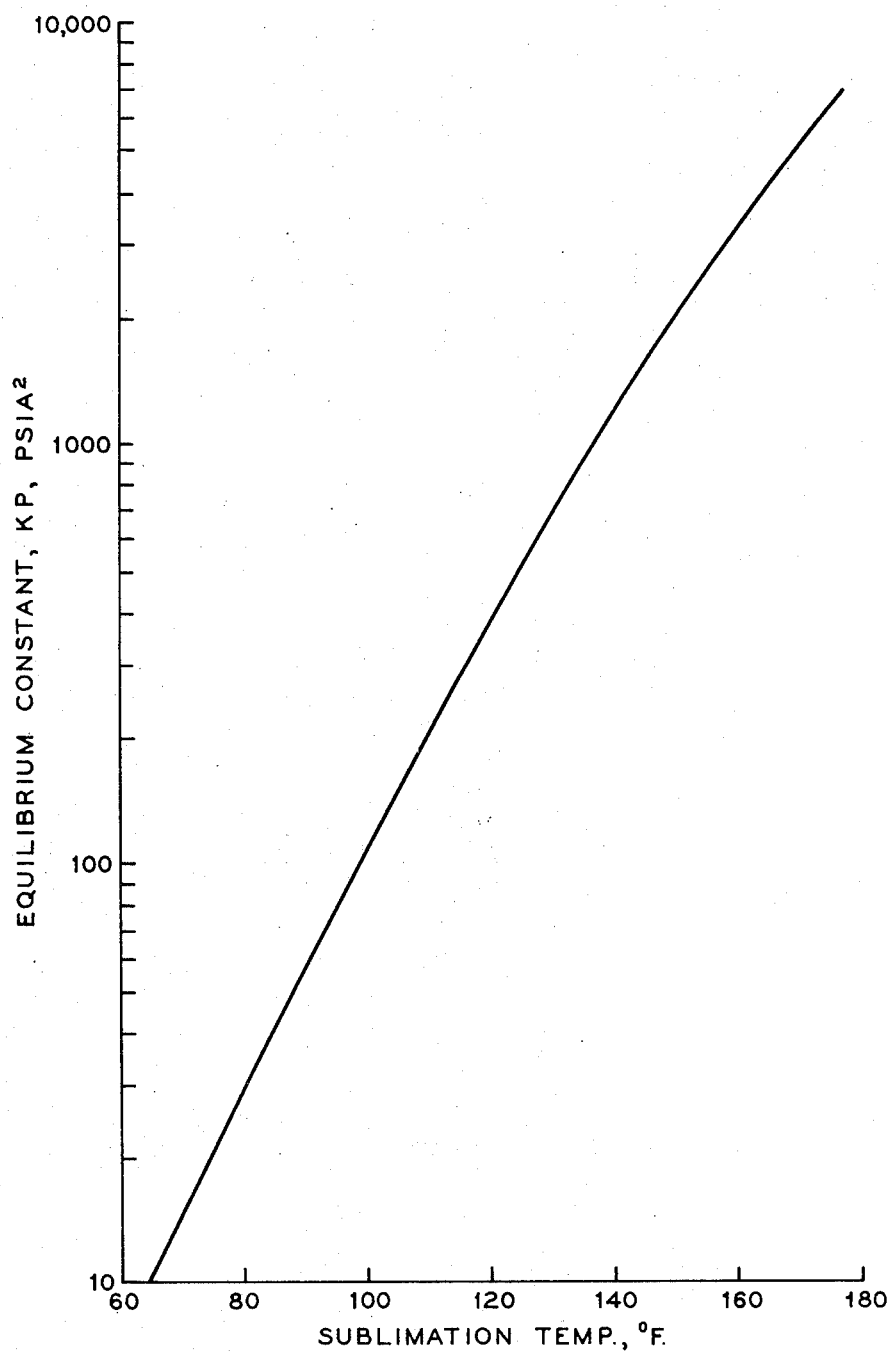
FIG. 2 is a graph indicating an equilibrium constant for $NH_4SH$ at various sublimation temperatures.

Referring now to FIG. 2, a graph is illustrated for the sublimation temperature of $NH_4SH$ versus the equilibrium constant for the reaction $NH_4SH \rightleftarrows NH_3 + H_2S$. The equilibrium constant is the partial pressure of $NH_3$ times the partial pressure of $H_2S$. The FIG. 2 graph is based on data from Luft, *Industrial Chemist*, October 1955. Above the curve in FIG. 2, the $NH_4SH$ exists as a solid, whereas below the curve, the $NH_4SH$ exists in a sublimated state or, in other words, $NH_3$ and $H_2S$ are present as gaseous components.

Figure 3:
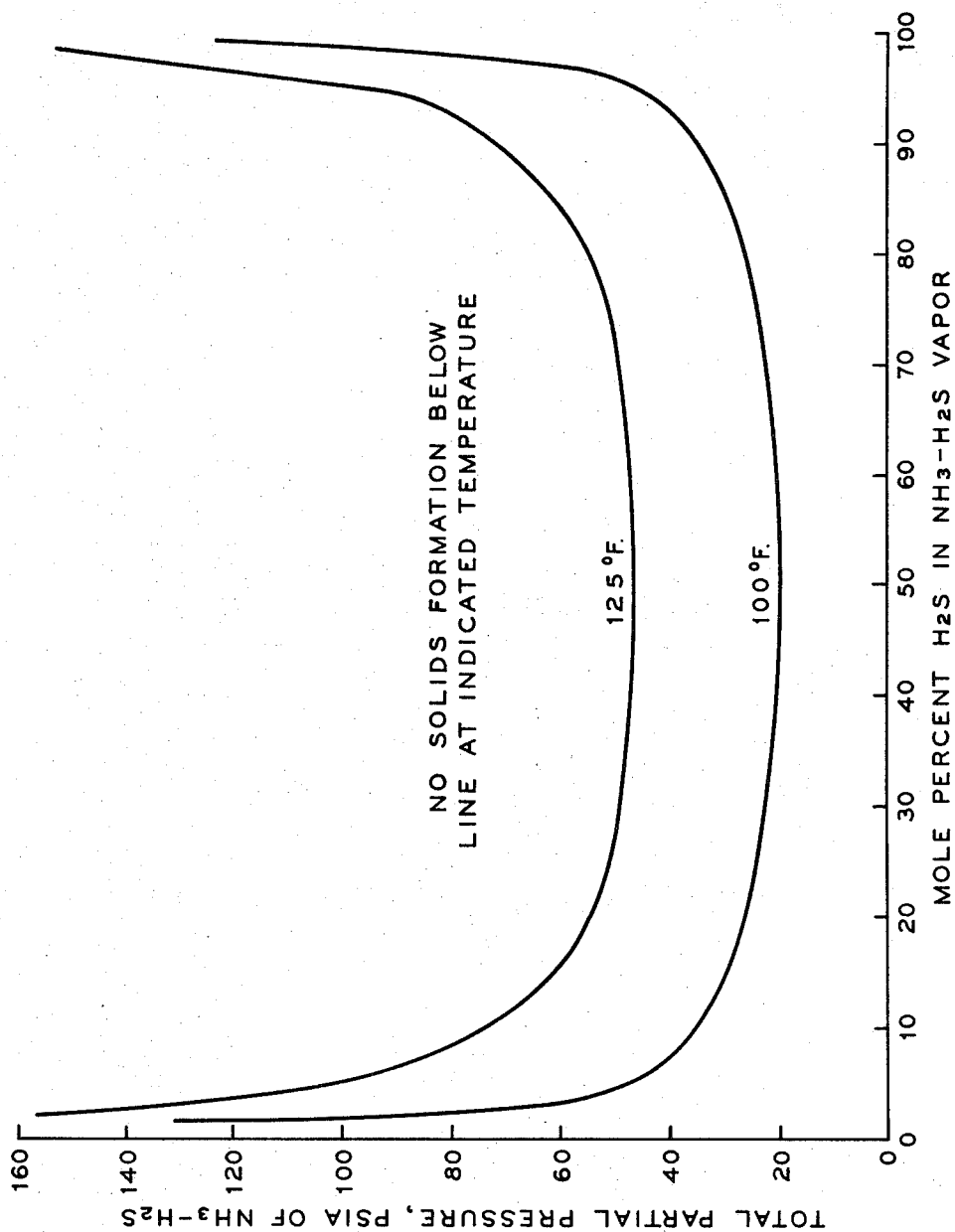
FIG. 3 is an alternate graph indicating sublimation conditions or the temperature and partial pressure conditions at which solid $NH_3$—$H_2S$ solids are formed.

FIG. 3 is similar to FIG. 2 excepting primarily that solids formation data for $NH_3$—$H_2S$ are presented in a different manner than it is in FIG. 2. In FIG. 3, the abscissa is mole percent $H_2S$ in the vapor phase on a basis of a vapor phase composed only of $H_2S$ and $NH_3$. The ordinate is total pressure in psia of the $NH_3$ and $H_2S$, i.e., the ordinate is the combined partial pressures of the $NH_3$ and $H_2S$ and not the total pressure prevailing, for example, in the effluent from a hydrotreating reactor.

FIG. 2 can be compared to FIG. 3, for example, by considering a hydrotreater reactor effluent containing 7.4 percent combined $H_2S$ and $NH_3$ at a temperature of 125° F., a pressure of 1,000 psig, and with the $NH_3$—$H_2S$ being 90 percent $NH_3$ and 10 percent $H_2S$. The total partial pressure of the $NH_3$ and $H_2S$ would be approximately 74 psia, the partial pressure of $H_2S$ would be approximately 7.4, and that of $NH_3$ would be approximately 66.6 psia.

Multiplying the partial pressures gives a product of about 500 psia². From FIG. 3 it is seen that at about 10 percent $H_2S$ in the $NH_3$—$H_2S$ vapor, the equilibrium point for solids formation is at about 74 psia total partial pressure of $NH_3$—$H_2S$. Similarly from FIG. 2, it is seen that at about 125° F., the Kp is approximately 500 psia².

It can be particularly seen from FIG. 3 that in carrying out the process of the present invention, high combined partial pressures for the $NH_3$—$N_2S$ are preferably avoided, particularly pressures above 100 psia combined partial pressures. Also, temperatures such as temperatures below 125° or 120° F. are preferably avoided ahead of the high pressure separator in accordance with the process of the present invention.

It can also be noted from FIG. 3 that significant quantities of either component present in the other component is more likely to result in solids formation than only trace amounts of one component in a major amount of another component. For example, at a given temperature and pressure, a mixture of 90 percent $NH_3$—10 percent $H_2S$ is more likely to form solids than 99 percent $NH_3$—1 percent $H_2S$. In the process of the present invention, operation is generally carried out with significant amounts of both the $NH_3$ and $H_2S$ components so that the sum of the partial pressures of $H_2S$ and $NH_3$ and temperature in the piping and exchanger immediately ahead of the high pressure separator are of primary importance.

The solids which are formed from the $NH_3$ and $H_2S$ reaction are herein generally referred to as $NH_4SH$, but it is to be understood that this is only the believed form of the solid reaction product from the $NH_3$—$H_2S$ reaction and other solids may be formed.

Exemplary conditions employing the process of the present invention for the hydrodesulfurization of a Kuwait atmospheric residuum from about 3 weight percent sulfur to about 1.0 weight percent sulfur are as follows. Residuum is contacted with a hydrotreating catalyst in a reactor at an elevated temperature and pressure and in the presence of hydrogen to reduce the sulfur content of the residuum to about 1 weight percent by converting organic sulfur compounds to $H_2S$ and sulfur-free organic compounds. Effluent from the hydrotreating reactor is cooled, by exchange with residuum feed to the reactor, to a temperature of about 475° F. and then passed to a hot high pressure separator. Liquid hydrocarbons are separated from gases and vaporized hydrocarbons in the hot high pressure separator. The liquid hydrocarbons are passed from the bottom of the separator to distillation facilities. The vaporized hydrocarbons and gases including $H_2S$, $NH_3$, and large quantities of unreacted hydrogen are removed from the top of the hot high pressure separator and cooled to a temperature between about 140° F. and 160° F. by a fin fan air exchanger. The cooled stream is introduced to a cold high pressure separator at a temperature of about 140° F. and a pressure of about 2,040 psig. Condensed liquid hydrocarbons are removed from the bottom of the cold high pressure separator and passed to distillation facilities. The gaseous stream removed from the top of the cold high pressure separator is equivalent to stream 17 in the drawing. The gaseous stream contains $H_2S$ at a partial pressure of about 60 psia and $NH_3$ at a partial pressure about 6 psia before scrubbing to remove the $H_2S$ and $NH_3$. The $H_2S$ and $NH_3$ are removed from the stream 17 recycle hydrogen by contacting or scrubbing the gaseous stream with an MEA solution or a DEA solution. Using a 15 weight percent MEA solution in water at an MEA solution rate of about 800 gallons per minute through line 18 results in an $H_2S$ and $NH_3$ removal of about 98 percent. Using a 30 weight percent DEA solution at a rate of about 500 gallons per minute results in about 90 volume percent $H_2S$ and $NH_3$ removal from the hydrogen recycle gas.

The water circulation rate via line 45 to the top of absorbent regenerator 32 is about 100 gallons per minute corresponding to the previously given amine circulation rates and $H_2S$—$NH_3$ recovery.

Although various embodiments of the invention have been described, it is to be understood that they are meant to be illustrative only and not limiting. Certain features may be changed without departing from the spirit or scope of the present invention. It is apparent that the present invention has broad application to the removal of both $NH_3$ and $H_2S$ from recycle hydrogen gas for a hydroconversion process while concomitantly avoiding solid formation in the reactor effluent lines and preferably producing $H_2S$ and $H_2S$—$NH_3$ streams for subsequent treatment. Accordingly, the invention is not to be construed as limited to the specific embodiments or examples discussed but only as defined in the appended claims.

We claim:

1. In a hydrotreating process wherein a hydrocarbon feed stock containing at least 0.5 weight percent sulfur and .05 weight percent nitrogen as organic compounds is contacted at elevated temperature and pressure and in the presence of hydrogen with a hydrotreating catalyst in a hydrotreating reactor to form an effluent comprising hydrocarbons, hydrogen sulfide, ammonia, and hydrogen, and wherein the effluent is withdrawn from the reactor and cooled and passed without water injection to a high pressure separator wherein hydrocarbons are separated from a hydrogen-rich recycle gas stream and wherein the separated hydrogen-rich gas stream is recycled at least in part to the hydrotreating reactor, the improvement which comprises contacting the recycle hydrogen-rich gas stream with an $H_2S$ and $NH_3$ absorbent to thereby remove from the recycle hydrogen-rich gas at least 90 volume percent of both the $H_2S$ and $NH_3$ before the hydrogen-rich gas is recycled to the hydrotreating reactor and maintaining conditions of temperature and partial pressures of $H_2S$ and $NH_3$ above sublimation conditions for $NH_4SH$ between the reactor effluent withdrawal point and said high pressure separator.

2. A process in accordance with claim 1 wherein at least 95 volume percent of the $H_2S$ and $NH_3$ are removed from the recycle hydrogen-rich gas before the gas is recycled to the hydrotreating reactor.

3. A process in accordance with claim 1 wherein the absorbent comprises a mixture of an alkanolamine with water.

4. A process in accordance with claim 1 wherein the high pressure separator is operated at a temperature of at least 130° F.

5. A process in accordance with claim 1 wherein the high pressure separator is operated at a temperature of at least 145° F.

6. A process in accordance with claim 4 wherein the hydrotreating process is directed to hydrodesulfurization of a feedstock selected from the group consisting of whole crude oil, reduced crude, and vacuum residuum.

7. In a hydrotreating process wherein a hydrocarbon feedstock containing organic sulfur and organic nitrogen compounds is contacted at elevated temperature and pressure and in the presence of hydrogen with hydrotreating catalyst in a hydrotreating reactor to form an effluent comprising hydrocarbons, hydrogen sulfide, ammonia and hydrogen and wherein the effluent is withdrawn from the reactor and cooled and passed to a high pressure separator wherein hydrocarbons are separated from a hydrogen-rich gas stream and wherein the separated hydrogen-rich gas stream is recycled at least in part to the hydrotreating reactor, the improvement which comprises contacting the recycle hydrogen-rich gas stream with an $H_2S$ and $NH_3$ absorbent to thereby remove from the recycle hydrogen-rich gas at least 90 volume percent of both the $H_2S$ and $NH_3$ before the recycle hydrogen-rich gas is recycled to the hydrotreating reactor, omitting aqueous injection into the hydrotreating reactor effluent between the reactor effluent withdrawal point and said high pressure separator, and maintaining conditions of temperature and partial pressures of $H_2S$ and $NH_3$ above sublimation condition for $NH_4SH$ between the reactor effluent withdrawal point and said high pressure separator, stripping $H_2S$ and $NH_3$ from the absorbent in a regenerator vessel and removing $H_2S$ and $NH_3$ together with water vapor as an overhead stream via an overhead line from the top of the regenerator vessel, injecting a recirculating water stream into the top of the regenerator vessel or into the overhead line from the top of the regenerator vessel so as to absorb $NH_3$, cooling the overhead stream so as to condense $H_2O$, passing the cooled overhead stream to an overhead separator vessel, withdrawing a gaseous stream of $H_2S$ containing less than 5 percent $NH_3$ from the separator, withdrawing a liquid stream comprising $H_2O$, $NH_3$, and $H_2S$ from the separator, stripping $H_2S$ and $NH_3$ from the liquid stream to obtain a purified water stream which is recirculated and injected into the regenerator overhead system as aforesaid to absorb $NH_3$.

8. A process in accordance with claim 7 wherein at least 95 volume percent of the $H_2S$ and $NH_3$ are removed from the recycle hydrogen-rich gas before the gas is recycled to the hydrotreating reactor.

9. A process in accordance with claim 7 wherein the absorbent comprises a mixture of an alkanolamine with water.

10. A process in accordance with claim 7 wherein the high pressure separator is operated at a temperature of at least 130° F.

11. A process in accordance with claim 7 wherein the high pressure separator is operated at a temperature of at least 145° F.

12. A process in accordance with claim 7 wherein the hydrotreating process is directed to hydrodesulfurization of a feedstock selected from the group consisting of whole crude oil, reduced crude, and vacuum residuum.

13. A process in accordance with claim 7 wherein the hydrocarbon feedstock contains organic nitrogen and sufficient organic sulfur and wherein the feedstock is hydrodesulfurized under sufficiently mild conditions to produce a hydrotreating reactor effluent containing at least three moles $H_2S$ per one mole $NH_3$.

14. A process in accordance with claim 13 wherein the $H_2S$—$NH_3$ which is stripped from the liquid stream is combusted with oxygen to obtain $SO_2$ and $N_2$ and the $SO_2$ is reacted with $H_2S$ withdrawn as a gaseous stream from the overhead separator vessel to form sulfur.

* * * * *